(12) United States Patent
Nakaya et al.

(10) Patent No.: US 11,628,721 B2
(45) Date of Patent: Apr. 18, 2023

(54) FUEL TANK WITH BUILT-IN COMPONENT ANCHORED TO TANK BODY

(71) Applicant: YACHIYO INDUSTRY CO., LTD., Saitama (JP)

(72) Inventors: Kazunari Nakaya, Tochigi (JP); Kazuyoshi Morooka, Tochigi (JP); Hiroya Mitsuhashi, Tochigi (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 17/796,587

(22) PCT Filed: Jan. 13, 2021

(86) PCT No.: PCT/JP2021/000786
§ 371 (c)(1),
(2) Date: Jul. 29, 2022

(87) PCT Pub. No.: WO2021/153226
PCT Pub. Date: Aug. 5, 2021

(65) Prior Publication Data
US 2023/0050517 A1    Feb. 16, 2023

(30) Foreign Application Priority Data

Jan. 31, 2020    (JP) .............................. JP2020-015663

(51) Int. Cl.
*B60K 15/03*    (2006.01)

(52) U.S. Cl.
CPC .... *B60K 15/03* (2013.01); *B60K 2015/03032* (2013.01)

(58) Field of Classification Search
CPC .......... B60K 15/03; B60K 2015/03467; B60K 2015/03032; B60K 2015/03381
See application file for complete search history.

(56) References Cited

U.S. PATENT DOCUMENTS

2004/0079752 A1\* 4/2004 Suzuki .................. B29C 66/232
220/4.13
2009/0139994 A1\* 6/2009 Aoki ................ B60K 15/03177
220/652

(Continued)

FOREIGN PATENT DOCUMENTS

JP    2009-132297 A    6/2009
JP    2013-513495 A    4/2013

(Continued)

OTHER PUBLICATIONS

International Search Report and Written Opinion of the International Search Report for PCT/JP2021/000786 dated Mar. 23, 2021.

*Primary Examiner* — Stephen J Castellano
(74) *Attorney, Agent, or Firm* — Kenealy Vaidya LLP

(57) ABSTRACT

A fuel tank includes a tank body and a built-in component, which has a head portion, a neck portion, and a shoulder portion, the built-in component being anchored to the tank body with a parison wrapped around the neck portion during molding of the tank body. The head portion and the neck portion are formed with at least one hollowed portion, which is open to an end surface of the head portion, and a cap member is provided to seal an opening of the at least one hollowed portion.

3 Claims, 11 Drawing Sheets

(56) References Cited

U.S. PATENT DOCUMENTS

| | | | |
|---|---|---|---|
| 2015/0239198 A1* | 8/2015 | Iwata | B60K 15/03177 |
| | | | 138/109 |
| 2021/0138894 A1* | 5/2021 | Ryu | B60K 15/03177 |
| 2022/0266682 A1* | 8/2022 | Morooka | B29C 49/20 |

FOREIGN PATENT DOCUMENTS

| | | |
|---|---|---|
| JP | 2019-188895 A | 10/2019 |
| WO | 2018/225413 A1 | 12/2018 |
| WO | 2021/153226 A1 | 8/2021 |

* cited by examiner

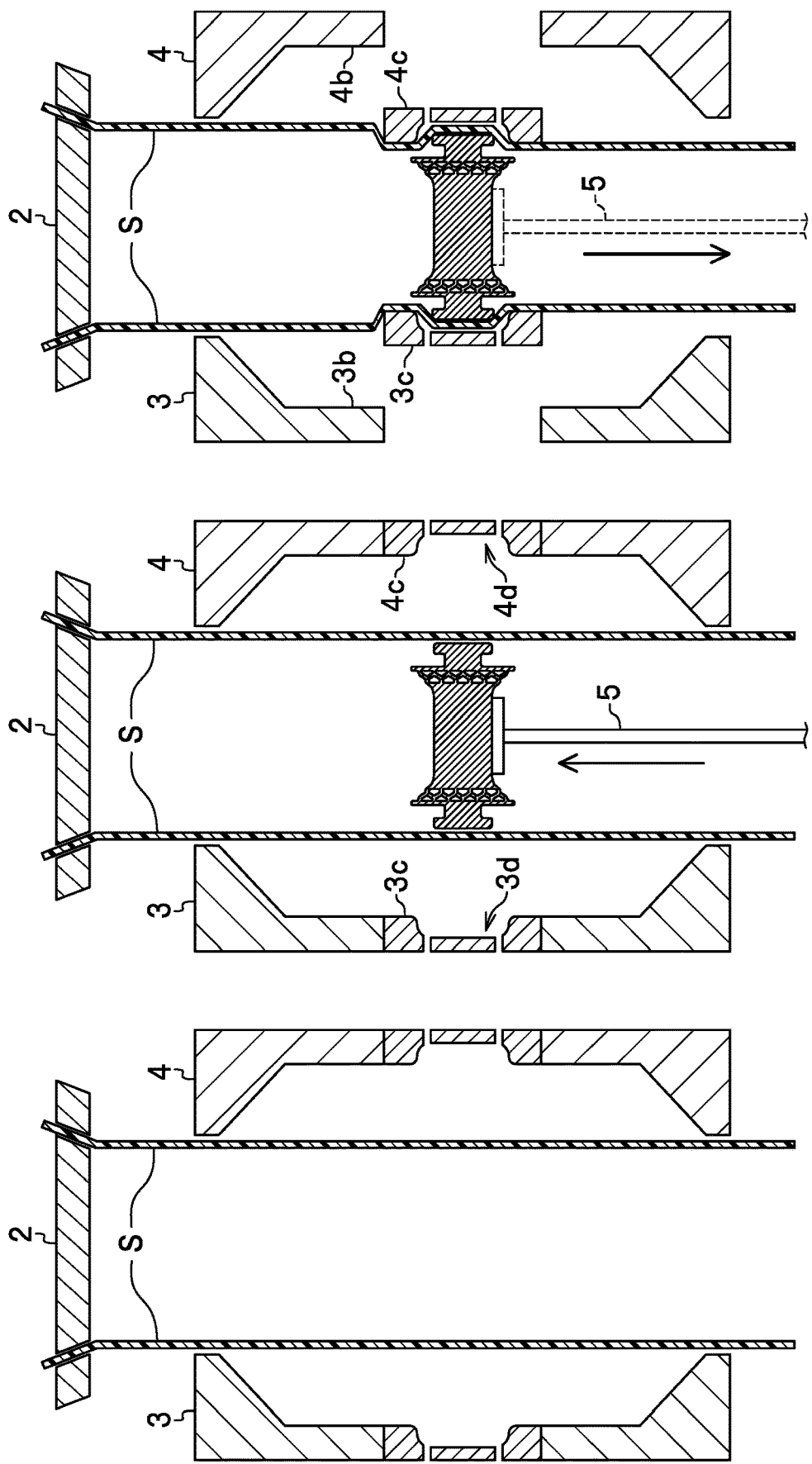

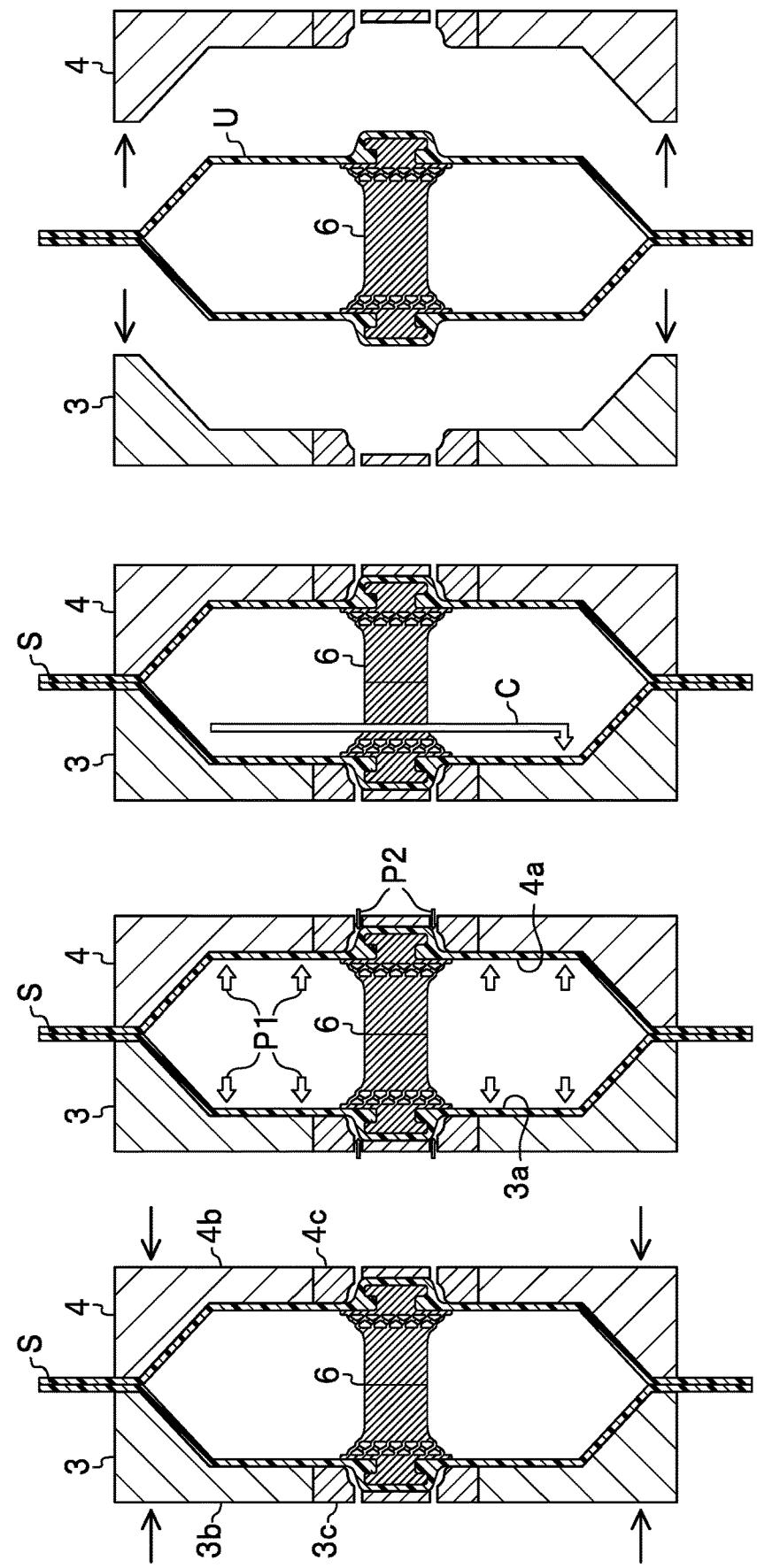

FUEL TANK WITH BUILT-IN COMPONENT ANCHORED TO TANK BODY

CROSS-REFERENCE TO RELATED APPLICATIONS

This application is a U.S. National Stage Application under 35 U.S.C § 371 of International Patent Application No. PCT/JP2021/000786 filed Jan. 13, 2021, which claims the benefit of priority under 35 USC 119 to Japanese Patent Application No. 2020-015663 filed Jan. 31, 2020, the disclosures of all of which are hereby incorporated by reference in their entireties.

TECHNICAL FIELD

The present invention relates to a fuel tank.

BACKGROUND ART

A method has been known for attaching a component, such as a valve, to a blow-molded product, such as a fuel tank of an automobile, as a built-in component. For example, Patent Document 1 describes a manufacturing method for a fuel tank containing a built-in component with a head portion, a neck portion, and a shoulder portion. In the manufacturing method for the fuel tank, this fuel tank has the built-in component anchored to a tank body, with air blown from outside a parison during molding a tank body to shape the parison along the neck portion. At that time, the air around the neck portion is discharged toward the tank body through holes communicating the neck portion with the tank body.

CITATION LIST

Patent Document 1
Patent Document 1: International Patent Application Publication No. 2018/225413

SUMMARY OF THE INVENTION

Problems to be Solved

To increase strength of anchorage of the built-in component, it is effective to increase a diameter of the head portion or neck portion. The built-in component with a larger diameter of the head portion or neck portion needs to have a hollowed head portion or neck portion, instead of a solid one, so as to prevent voids during molding. However, in a case where hollowed portions are open to an end surface of the head portion, when the built-in component is anchored to the tank body, the parison enters the hollowed portions. If the parison enters the hollowed portions, a thickness of the parison may vary, and a barrier layer may break.

The present invention is devised from the viewpoint described above, and is intended to prevent a parison from entering hollowed portions formed in a head portion and neck portion of a built-in component.

Solution to Problem

To solve the problems above, a fuel tank includes a tank body and a built-in component, which has a head portion, a neck portion, and a shoulder portion, the built-in component being anchored to the tank body with a parison wrapped around the neck portion during molding of the tank body. The head portion and the neck portion are formed with at least one hollowed portion, which is open to an end surface of the head portion, and a cap member is provided to seal an opening of the at least one hollowed portion.

According to the present invention, a cap member is provided on an opening of hollowed portion, to prevent a parison from entering the hollowed portions formed in the head portion and neck portion during molding, so that variation in thickness of the parison is reduced and a barrier layer is prevented from being ruptured.

In addition, it is preferable that the neck portion is formed with a first communicating portion which communicates an outside thereof with the hollowed portion, the shoulder portion is formed with a second communicating portion which communicates the hollowed portion with an interior of the tank body, and air outside the neck portion flows into the interior of the tank body through the first communicating portion and the second communicating portion. With the structure above, air around the neck portion is discharged into the tank body, to securely allow the parison to be shaped around the neck portion.

Further, it is preferable that a plurality of the hollowed portions are formed, and a third communicating portion is formed to communicate adjacent hollowed portions with each other. With the structure above, air around the neck portion is efficiently discharged into the interior of the tank body through the first communicating portion, the second communicating portion, and the third communicating portion.

Advantageous Effects of the Invention

A fuel tank of the present invention prevents a parison from entering hollowed portions formed in the head portion and neck portion.

BRIEF DESCRIPTION OF THE DRAWINGS

FIG. 10A is a diagram to illustrate a step of injecting a parison in a method of manufacturing a fuel tank with the fuel tank manufacturing device;

FIG. 10B is a diagram to illustrate a step of putting in the built-in component in the method of manufacturing a fuel tank with the fuel tank manufacturing device;

FIG. 10C is a diagram to illustrate a step of provisionally setting the built-in component in the method of manufacturing a fuel tank with the fuel tank manufacturing device;

FIG. 11A is a diagram to illustrate a step of closing molding dies in the method of manufacturing a fuel tank with the fuel tank manufacturing device;

FIG. 11B is a diagram to illustrate a step of blow molding in the method of manufacturing a fuel tank with the fuel tank manufacturing device;

FIG. 11C is a diagram to illustrate a step of cooling the parison in the method of manufacturing a fuel tank with the fuel tank manufacturing device; and FIG. 11D is a diagram to illustrate a step of opening the molding dies in the method of manufacturing a fuel tank with the fuel tank manufacturing device.

DETAILED DESCRIPTION OF EMBODIMENTS

<<Fuel Tank of Embodiment>>

Figure 1:
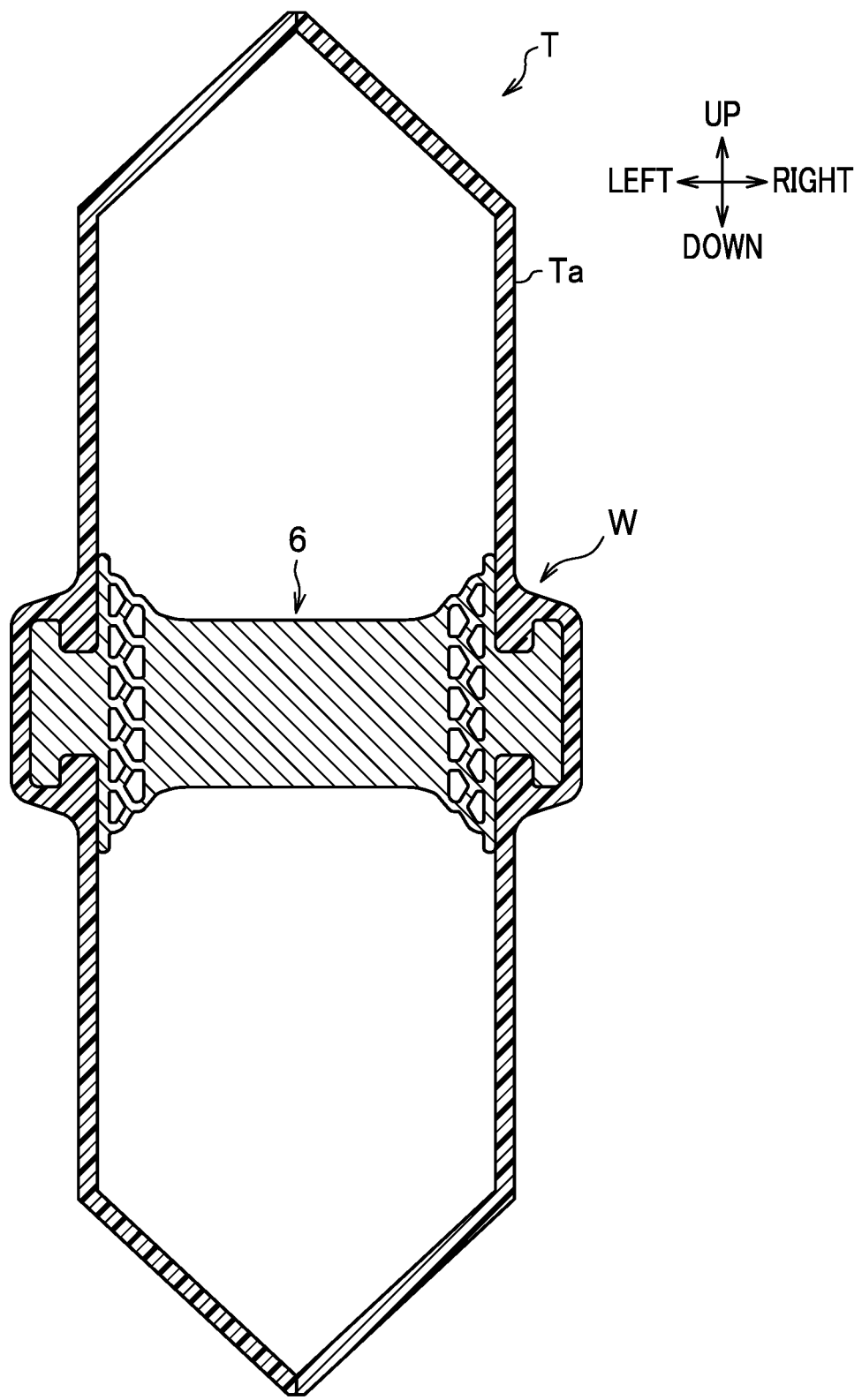
FIG. 1 is a schematic cross-sectional view of a fuel tank according to an embodiment of the present invention.

A fuel tank T shown in FIG. 1 is configured to be mounted on a transportation such as an automobile, a motorcycle, and a ship, and mainly includes a tank body Ta and a built-in component 6. As shown in FIG. 1, the present embodiment exemplarily provides a columnar reinforcing member for maintaining strength of the fuel tank T, as the built-in component 6, but the built-in component 6 may be a valve, a wave-eliminating plate, or the like. In the following description, "up-down" and "right-left" follow arrows in FIG. 1. These directions are defined for the purpose of illustration and do not limit the present invention. Note that the right-left direction in FIG. 1 corresponds to an open-close direction of a pair of molding dies used for manufacturing the fuel tank T.

The tank body Ta is a hollow container made of a resin for storing fuel such as gasoline, and has a multi-layered structure including a barrier layer, for example. The tank body Ta is made of mainly a thermoplastic resin such as polyethylene or high-density polyethylene. The tank body Ta is formed by blow molding, for example.

A configuration of the built-in component 6 is described below, with reference to FIGS. 2 to 6. The built-in component 6 may be made of a material (thermoplastic resin such as PE (polyethylene) that can be welded to a parison S (see FIG. 7) as a pre-shaped body of the tank body Ta or a material (such as POM) that cannot be welded to the parison S. The parison S is formed to have a multi-layered structure in cross section made of HDPE (high-density polyethylene), EVOH (ethylene-vinyl alcohol copolymer), an adhesive layer, and the like.

Figure 2:
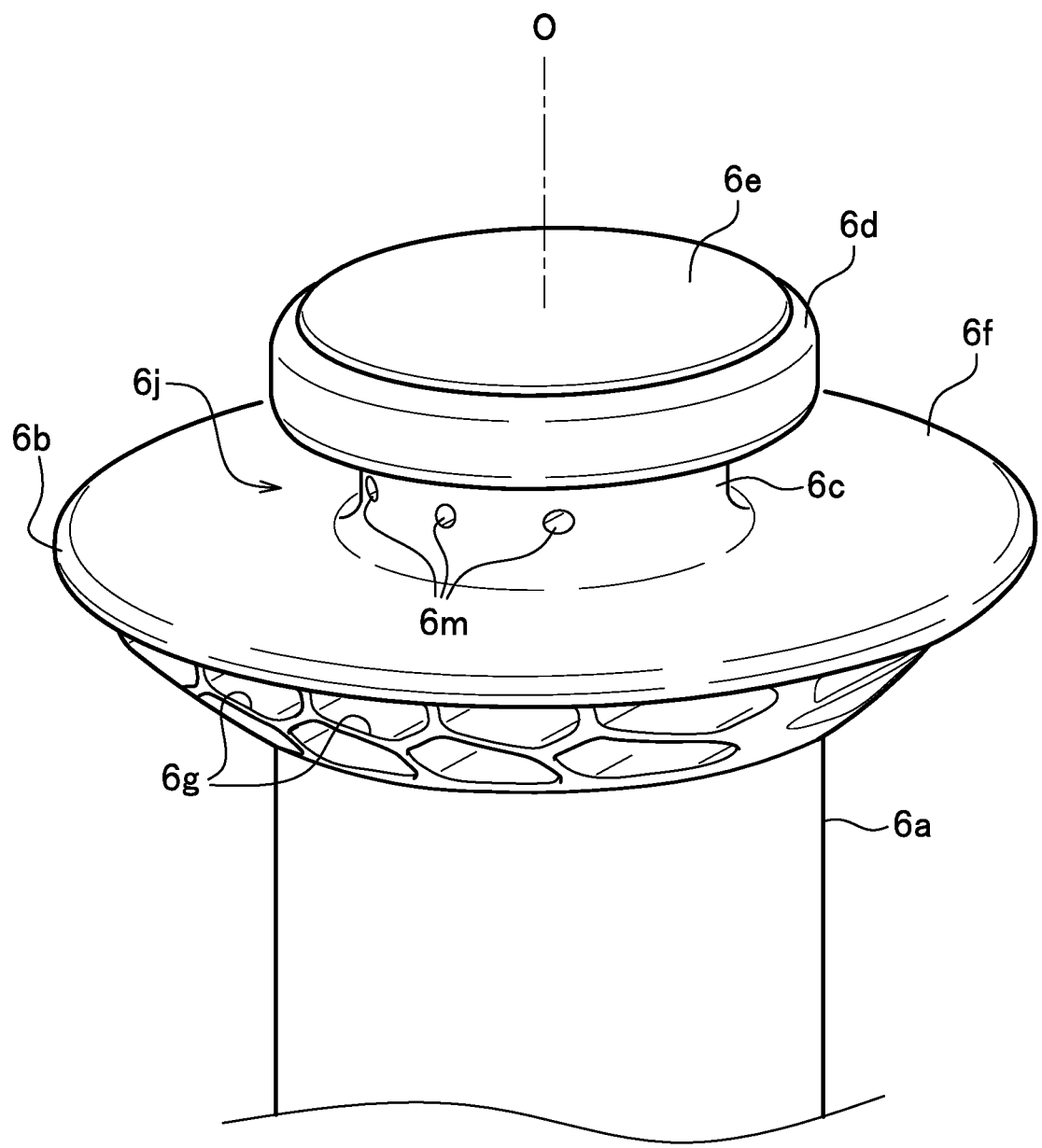
FIG. 2 is an external perspective view of a built-in component.
Figure 2:
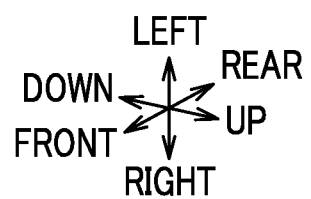

As shown in FIG. 2, the built-in component 6 includes a body portion 6a, shoulder portions 6b formed at both ends of the body portion 6a, neck portions 6c formed on outer sides of the shoulder portions 6b, and head portions 6d. The structure of the built-in component 6 is bilaterally symmetrical in mirror image (vertically on the plane of a drawing sheet). Thus, only one side is described here, unless otherwise specified. In addition, in the description of the built-in component 6, a surface facing the body portion 6a is referred to as a "back surface" and a surface opposite to the "back surface" is referred to as a "front surface".

The body portion 6a in FIG. 2 serves as a main body of the built-in component 6. The body portion 6a has a cylindrical shape, with a tip thereof expanding toward the shoulder portion 6b. An end of the body portion 6a is formed with a plurality of columnar hollow holes 6g. The columnar hollow holes 6g serve to communicate communicating portions 6h (FIG. 5B) with the tank body Ta. The columnar hollow holes 6g serve to circulate air when the parison S to be described below is welded to the built-in component 6.

Figure 7:
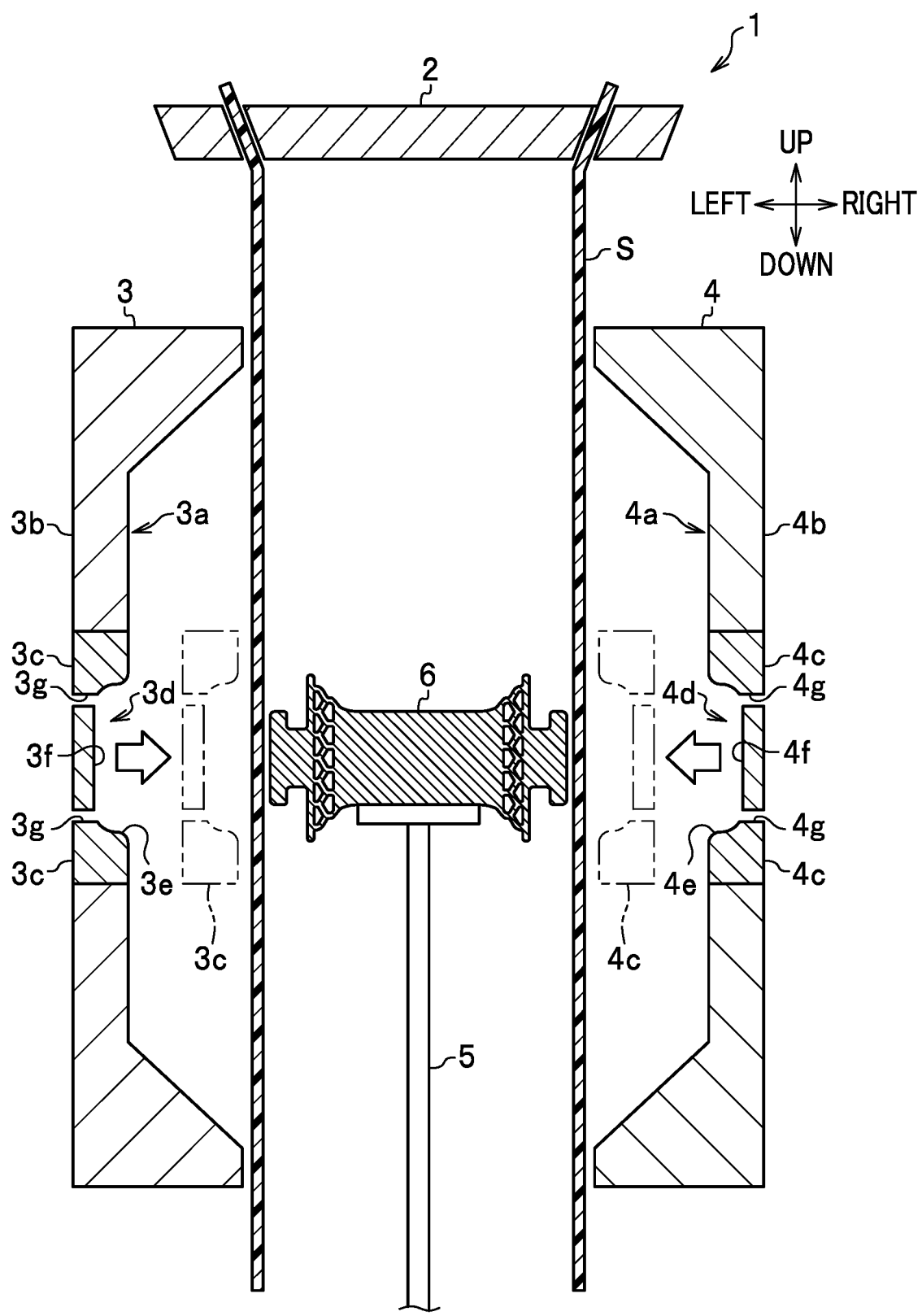
FIG. 7 is a schematic vertical cross-sectional view of a fuel tank manufacturing device.

The shoulder portion 6b in FIG. 2 serves to cover a recess 3d of a first molding die 3 or a recess 4d of a second molding die 4 shown in FIG. 7. The shape or size of the shoulder portion 6b is not particularly limited as long as the recess 3d or 4d can be covered therewith. The shoulder portion 6b here has a disk shape made of a thin plate, and an outer diameter rb of the shoulder portion 6b is larger than an outer diameter ra of the body portion 6a, as shown in FIG. 3.

Figure 3:
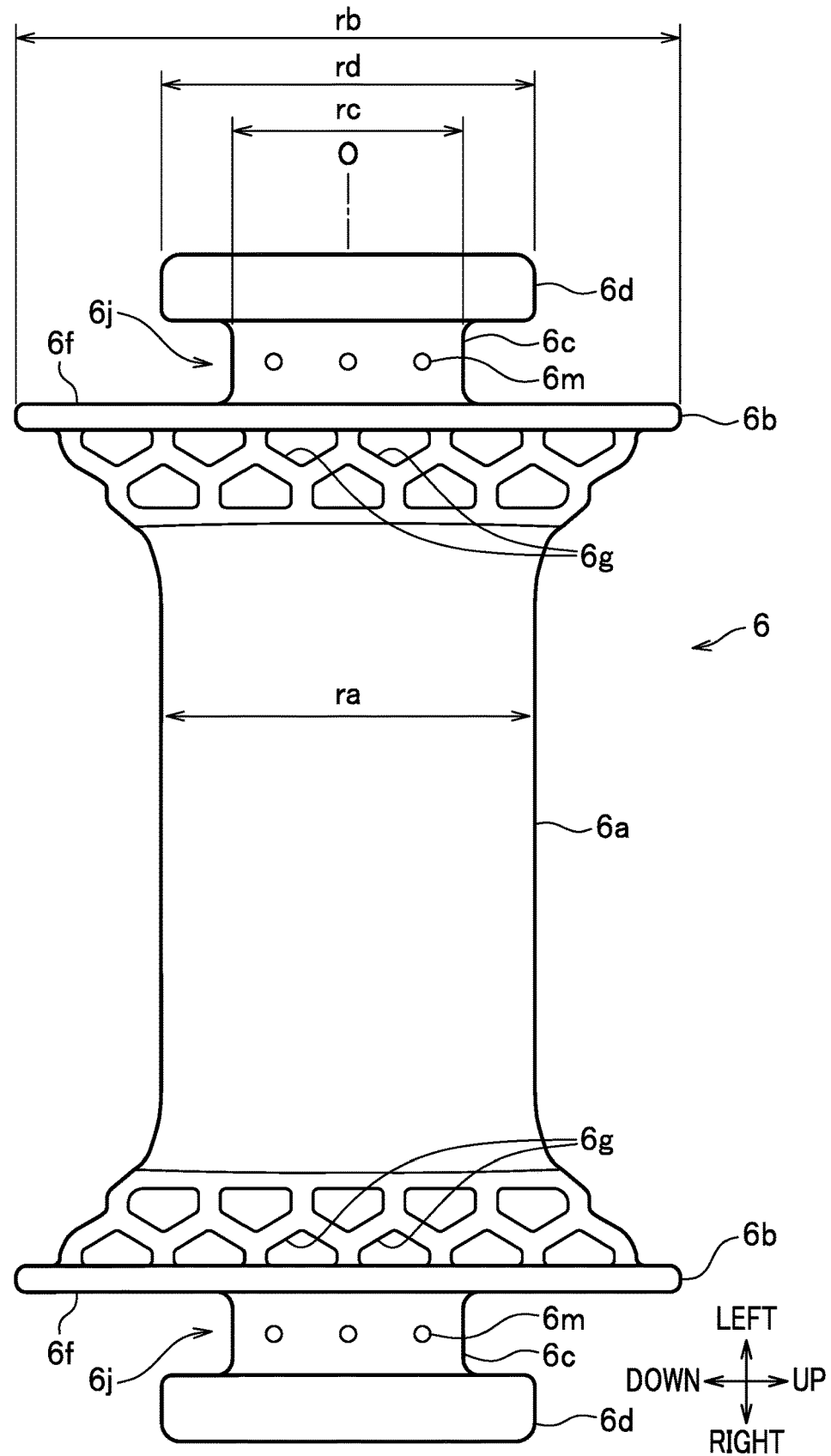
FIG. 3 is a front view of the built-in component.

The neck portion 6c shown in FIG. 2 serves to couple the shoulder portion 6b with the head portion 6d and has a smaller diameter than the shoulder portion 6b and the head portion 6d, as shown in FIG. 3. The neck portion 6c here erects from a front surface 6f of the shoulder portion 6b to exhibit a columnar shape. A corner between the shoulder portion 6b and the neck portion 6c and a corner between the head portion 6d and the neck portion 6c are rounded (R-surface).

As shown in FIG. 2, the neck portion 6c is formed with six communicating portions (first communicating portions) 6m along a circumferential direction thereof. The communicating portions 6m are holes to communicate an outside of the neck portion 6c with hollowed portions 6k (see FIG. 5A). The communicating portions 6m serve as air discharge paths to discharge air in a gap 6j (described below) when the parison S enters the gap 6j during molding. The shape, the number, and the like of the communicating portions 6m are not particularly limited as long as the air can be discharged therethrough.

The head portion 6d in FIG. 2 has a thicker disk shape than the shoulder portion 6b. Note that a thickness relationship between the shoulder portion 6b and the head portion 6d here is merely an example, and the shoulder portion 6b may be formed thicker than the head portion 6d. As shown in FIG. 3, an outer diameter rd of the head portion 6d is larger than an outer diameter rc of the neck portion 6c and is smaller than the outer diameter rb of the shoulder portion 6b. Due to the shapes described above, the gap 6j with the neck portion 6c as a bottom is defined between the shoulder portion 6b and the head portion 6d. The gap 6j is a space into which the parison S enters during molding.

The shape or size of the head portion 6d is not particularly limited as long as the parison S enters around the head portion 6d and neck portion 6c to anchor the built-in component 6 to the tank body Ta (see FIG. 1). A portion of the parison S wrapping around the neck portion 6c is referred to as a "wrapping parison portion W" (see FIG. 9).

A cap member 6e in FIG. 2 is configured to be placed on an end surface of the head portion 6d to seal openings (see FIG. 4) of the hollowed portions 6k. The cap member 6e seals the openings of the hollowed portions 6k to prevent the parison S from entering the hollowed portions 6k during molding. A material of the cap member 6e is not particularly limited, but in the present embodiment, the cap member 6e is formed of the same material as the built-in component 6, for example.

Figure 4:
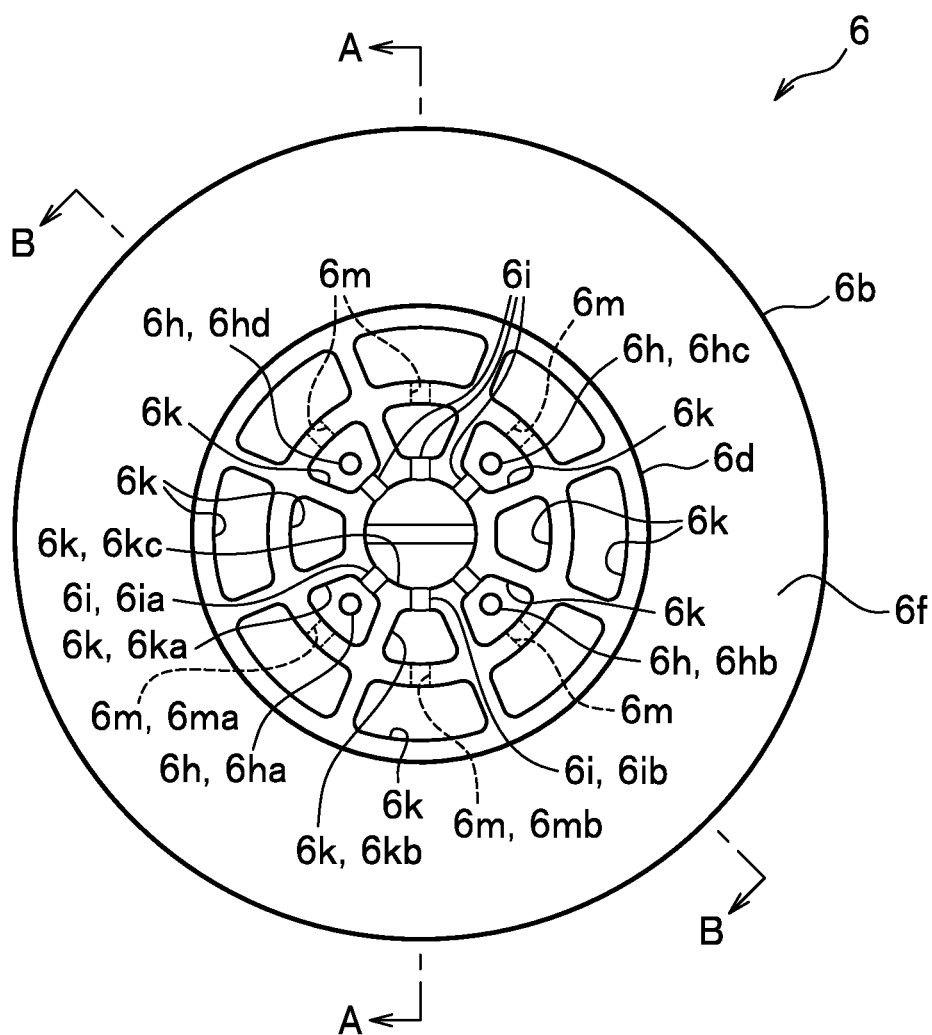
FIG. 4 is a plan view of the built-in component.

As shown in FIG. 4, the head portion 6d and neck portion 6c are formed with a plurality of the hollowed portions 6k. The hollowed portions 6k are open to the end surface of the head portion 6d and are hollow from the head portion 6d to the neck portion 6c. In the present embodiment, the openings of the hollowed portions 6k are sealed by the cap member 6e.

Figure 5A:
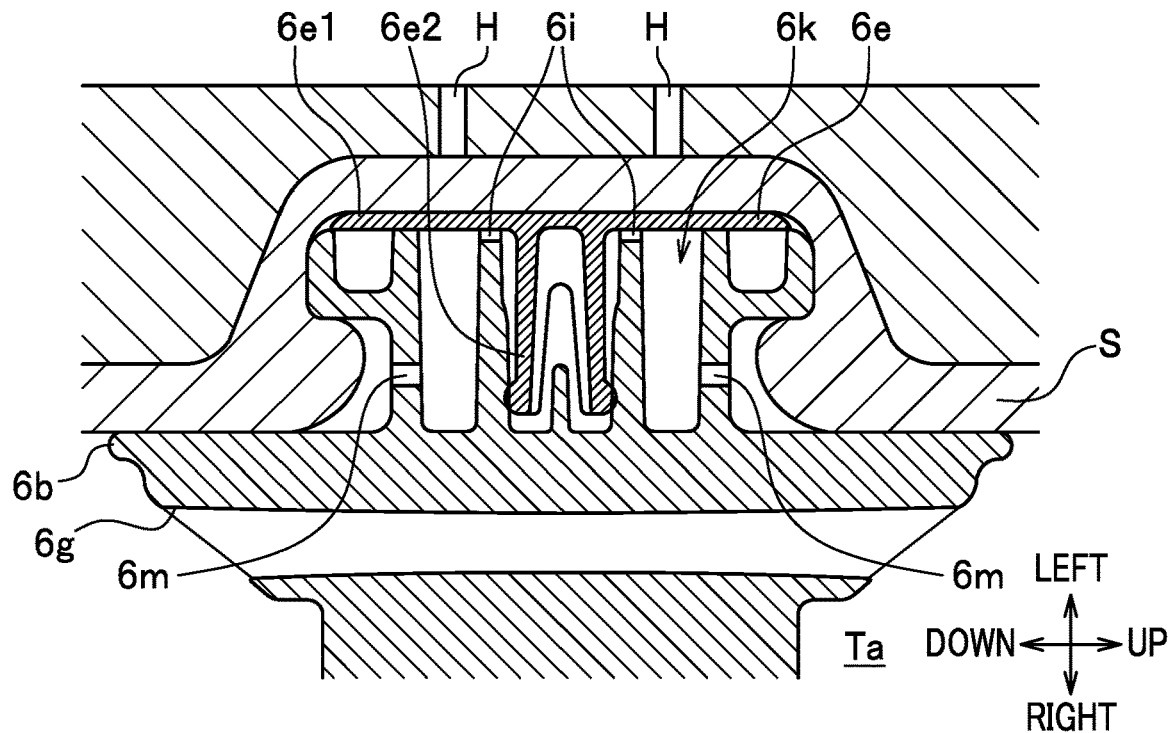
FIG. 5A is a cross-sectional view of the built-in component, taken along a line A-A.

As shown in FIG. 5A, the cap member 6e is formed with a lid 6e1 and a leg 6e2. When the lid 6e1 is placed so as to seal the openings of the hollowed portions 6k, the leg 6e2 is inserted into and engages with the hollowed portion 6k. The leg 6e2 is engaged in the hollowed portion 6k so that the lid 6e1 is prevented from rotating and can be fixed in place.

The lid 6e1 is formed to have a flat surface and serves to close the openings of all the hollowed portions 6k so as to prevent the parison S or the like from entering the hollowed portions 6k. The lid 6e1 has any shape to seal the openings of the hollowed portions 6k and may be formed appropriately according to the shape of the head portion 6d.

The leg 6e2 is formed in two halves, and is inserted into the hollowed portion 6k to be fixed therein. The shape of leg 6e2 is not limited as long as the lid 6e1 can be prevented from coming off or rotating. Note that the leg 6e2 may be omitted if other mechanisms are provided to fix the lid 6e1.

As shown in FIG. 4, the head portion 6d is formed with six grooved communicating portions (third communicating portions) 6i in a circumferential direction thereof. The communicating portions 6i are formed in the end surface of the head portion 6d to serve as air discharge holes when the cap member 6e is placed on the head portion 6d. For example, a communicating portion 6ia communicates a hollowed portion 6kc, which is formed in the center, with a hollowed portion 6ka, which is formed on an outer side in the radial direction thereof. In addition, for example, a communicating portion 6ib communicates the hollowed portion 6kc, which is formed in the center, with a hollowed portion 6kb, which is formed on an outer side in the radial direction thereof.

Figure 6:
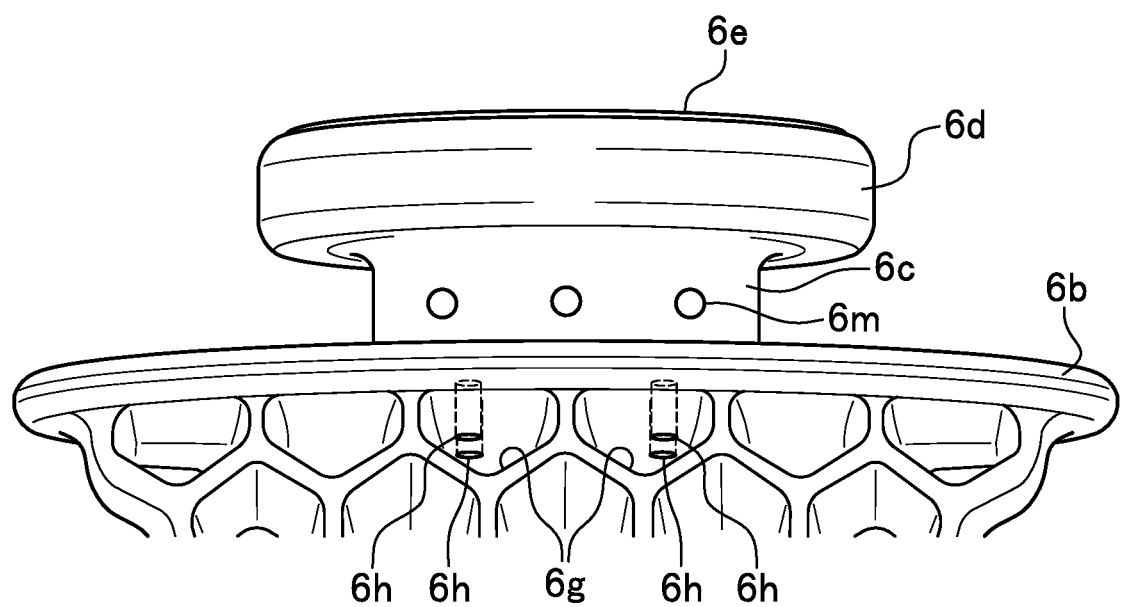
FIG. 6 is an enlarged perspective view of the built-in component.

In addition, the shoulder portion 6b is formed with four communicating portions (second communicating portions) 6h. As shown in FIG. 6, the communicating portions 6h are formed to communicate the hollowed portions 6k with the body portion 6a (inside the tank body Ta) as shown in FIG. 6. Note that the shapes, the number, and the like of the communicating portions 6i and communicating portions 6h are not particularly limited as long as air can be discharged.

Figure 5B:
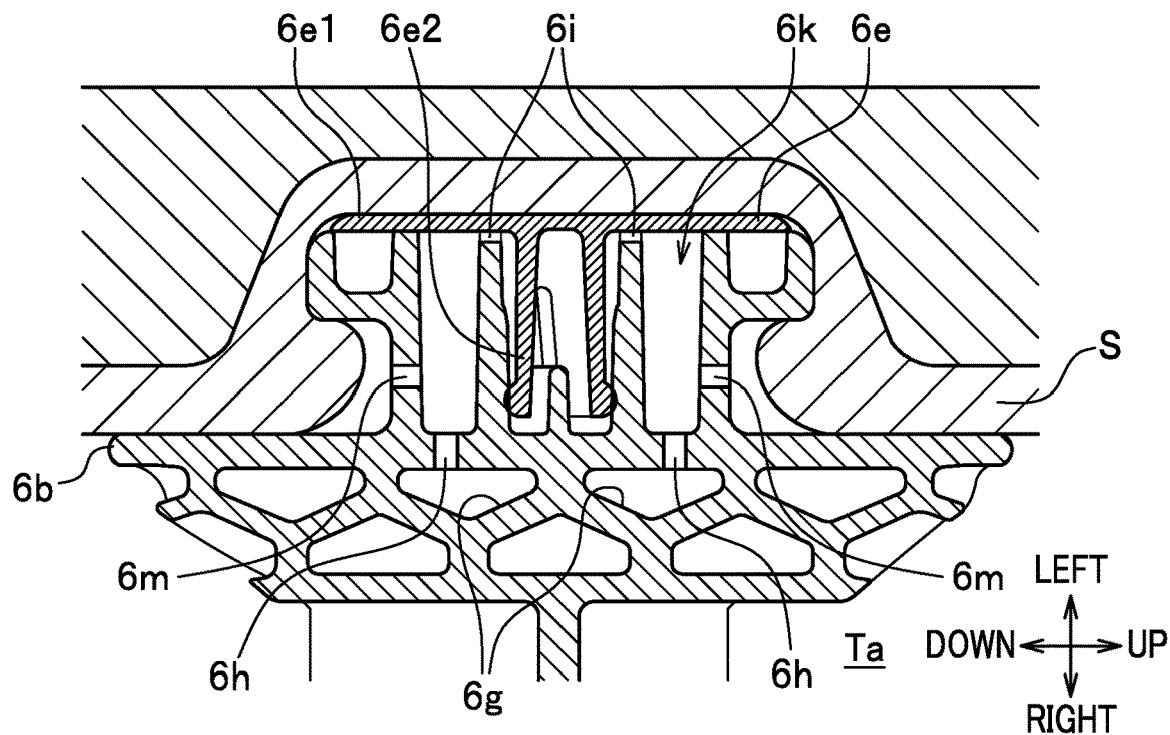
FIG. 5B is a cross-sectional view of the built-in component, taken along a line B-B.

Next, a description is given of an air flow during molding, with reference to FIG. 4 (see also FIGS. 5A and 5B, as appropriate). For example, air entering from an outside of the neck portion 6c into a communicating portion 6ma is discharged into the tank body Ta through the hollowed portion 6ka, a communicating portion 6ha, and the columnar hollow hole 6g. Similarly, for example, air entering through a communicating portion 6mb of the neck portion 6c is discharged into the tank body Ta through the hollowed portion 6kb, the communicating portion 6ib, the hollowed portion 6kc, the communicating portion 6ia, the hollowed portion 6ka, the communicating portion 6ha, and the columnar hollow hole 6g. The air flow described above is an example, and the hollowed portion 6kc, which is formed in the center, communicates with a plurality of the communicating portions 6i, respectively, in the present embodiment so that the air entering through the communicating portion 6ma can flow through either any one of or all of the communicating portions 6ha, 6hb, 6hc, and 6hd.

<<Method of Manufacturing Fuel Tank According to Embodiment>>

A fuel tank manufacturing device 1 shown in FIG. 7 is configured to blow-mold the parison S in a cylindrical shape to manufacture the fuel tank T (see FIG. 1) having the built-in component 6 inside. Note that the fuel tank T may be manufactured with a parison in a sheet shape (not shown).

As shown in FIG. 7, the fuel tank manufacturing device 1 mainly includes a die 2, a first molding die 3 and a second molding die 4 in a pair, and an elevator 5 to be moved up and down between the first molding die 3 and second molding die 4.

The die 2 is arranged above the first molding die 3 and second molding die 4, and serves to supply the parison S to the first molding die 3 and second molding die 4. The parison SA has a multi-layered structure in cross section made of HDPE (high-density polyethylene), EVOH (ethylene-vinyl alcohol copolymer), an adhesive layer, and the like, and is a pre-shaped body of the tank body Ta to constitute the fuel tank T (see FIG. 1).

The first molding die 3 and second molding die 4 in FIG. 7 serve to clamp-mold the fuel tank T (see FIG. 1). The first molding die 3 and second molding die 4 are arranged to face each other, and are formed, in the facing surfaces thereof, with molding portions 3a and 4a in a concave shape. The first molding die 3 and second molding die 4 can be moved in the right-left direction so as to be opened and closed, and the parison S is supplied in a state that the first molding die 3 and second molding die 4 are opened (the state shown in FIG. 7). In addition, the first molding die 3 and second molding die 4 are provided with blow pins (not shown) for blowing air into the first molding die 3 and second molding die 4, so that air pressure (blow pressure) in the first molding die 3 and second molding die 4 is suitably adjusted by a first positive pressure applying device (not shown). The parison S is transferred to the molding portions 3a and 4a by the first positive pressure applying device.

The first molding die 3 is configured to be separable, and includes a main body portion 3b and a separating portion 3c that can be separated from the main body portion 3b. Similarly, the second molding die 4 is configured to be separable, and includes a main body portion 4b and a separating portion 4c that can be separated from the main body portion 4b. The separating portions 3c and 4c are respectively formed with the recesses 3d and 4d corresponding to the shapes of both ends of the built-in component 6, and the recesses 3d and 4d partly accommodate the built-in component 6. The recesses 3d and 4d here are formed into a columnar shape. In addition, the recesses 3d and 4d are provided, in bottoms 3f and 4f therefor, with a plurality of air holes 3g and 4g, respectively, for blowing air into the recesses 3d and 4d, so that air pressure (blow pressure) in the recesses 3d and 4d is suitably adjusted by a second positive pressure applying device (not shown).

The elevator 5 serves to move the built-in component 6 to a mounting position. The mounting position here is inside the parison S in a cylindrical shape and between the separating portions 3c and 4c.

Next, a description is given of operation of the fuel tank manufacturing device 1. Before describing the whole process of the method of manufacturing the fuel tank T (see FIG. 1) with the fuel tank manufacturing device 1, a description is given of transferring the parison around ends of the built-in component 6.

<Transferring Parison Around Ends of Built-in Component>

Figure 8:
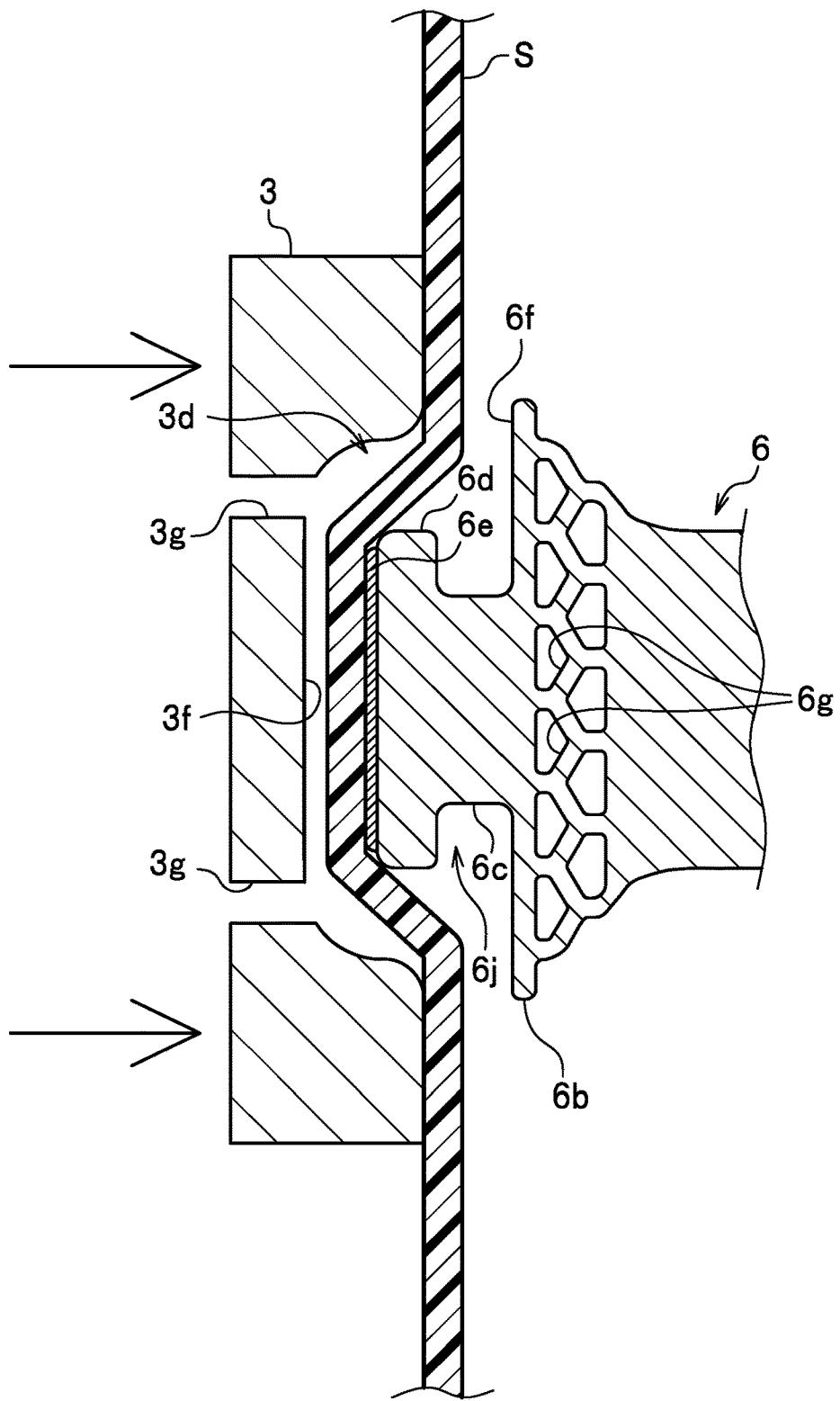
FIG. 8 is a diagram to illustrate transferring a parison around an end of the built-in component during molding.
Figure 9:
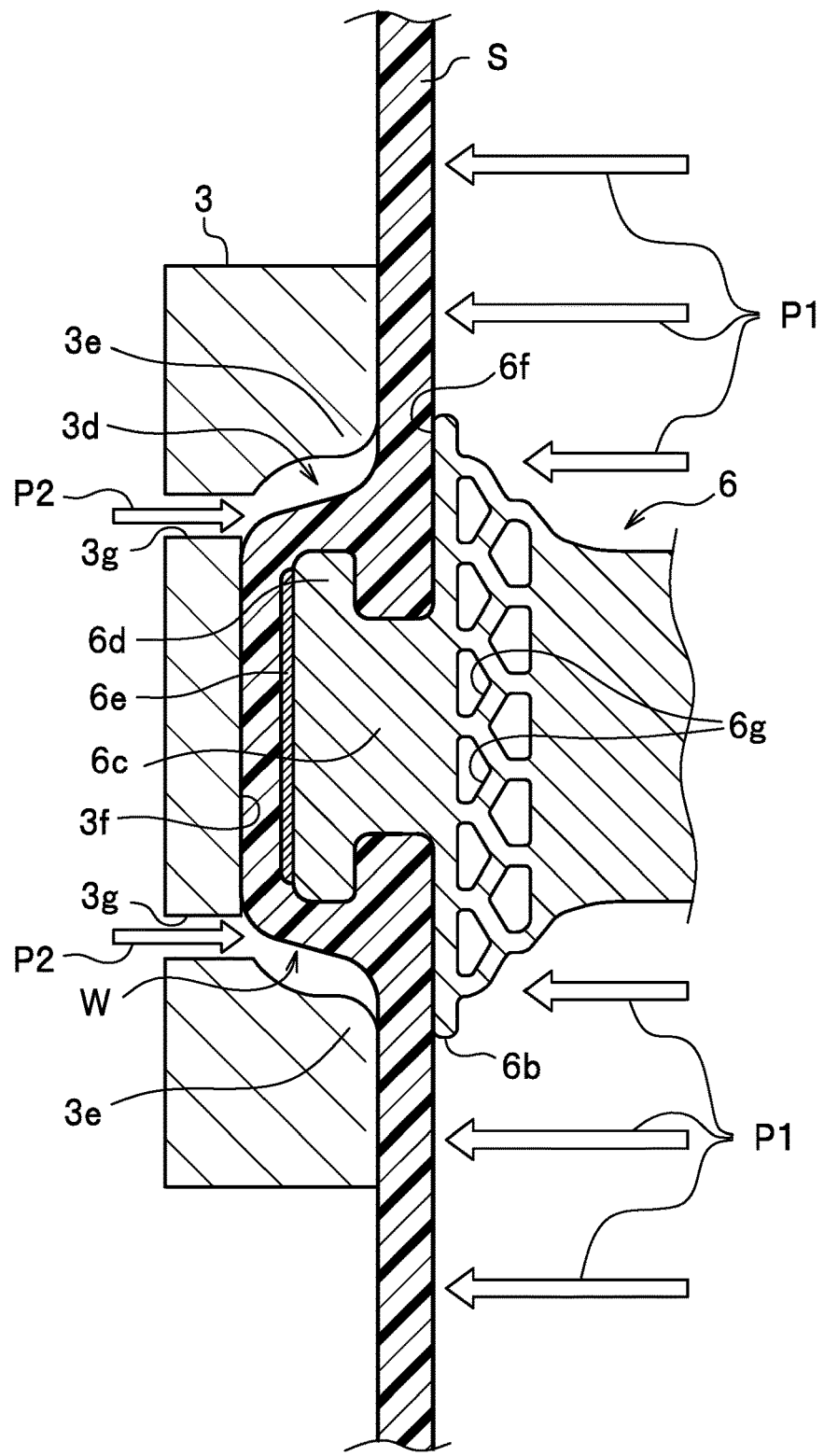
FIG. 9 is a diagram to illustrate transferring the parison around the end of the built-in component during molding.

A description is given of transferring the parison S around the ends of the built-in component 6 during molding, with reference to FIGS. 8 and 9 (see FIGS. 1 to 7 as appropriate). Note that a description is given here of the first molding die 3, but the same applies to the second molding die 4. FIGS. 8 and 9 show the built-in component 6 in cross section taken along a line B-B in FIG. 4. In the fuel tank manufacturing process, the first molding die 3 is moved in the arrow direction, as shown in FIG. 8 for clamping so that the neck portion 6c and head portion 6d of the built-in component 6 are pushed into the recess 3d along with the parison S.

As shown in FIG. 9, when the shoulder portion 6b contacts the parison S and covers an opening of the recess 3d, and the neck portion 6c and head portion 6d are completely pushed (accommodated) into the recess 3d, air is blown into the first molding die 3 to generate a positive pressure P1 (first positive pressure) in the parison S so that the parison S is transferred to the first molding die 3. In addition, air is blown into the recess 3d through the air hole 3g formed in the recess 3d to generate a positive pressure P2 (second positive pressure) in the recess 3d, so that the parison S is made to enter the gap 6j between the shoulder portion 6b and head portion 6d for the transferring. The air in the gap 6j is discharged into the tank body Ta through the communicating portions (first communicating portions) 6m, the communicating portions (second communicating portions) 6h, the communicating portions (third communicating portions) 6i, the hollowed portions 6k, and the columnar hollow holes 6g, as appropriate.

Further, at this time, the parison S is pressed between the shoulder portion 6b and the first molding die 3 so that the parison S and the shoulder portion 6b are welded to each other. In addition, the parison S is pressed to the head portion 6d by the positive pressure P2 so that the parison S and the head portion 6d are welded to each other. Note that the built-in component 6 may be pushed toward the recess 3d to hold the parison S between the head portion 6d and the bottom portion 3f, to weld the parison S and the head portion 6d to each other.

Next, a description is given of the whole process of the first fuel tank manufacturing device 1.

<Step of Injecting Parison>

The die 2 injects the parison S in a cylindrical shape into a space between the first molding die 3 and second molding die 4 which are both opened, as shown in FIG. 10A.

<Step of Putting in Built-in Component>

Next, the elevator 5 is moved up, with the built-in component 6 held, to move the built-in component 6 to the mounting position, as shown in FIG. 10B. Here, the mounting position is located inside the parison S and between the separating portions 3c and 4c.

<Step of Provisionally Setting Built-in Component>

Next, the separating portions 3c and 4c of the first molding die 3 and second molding die 4 are moved closer in a direction of facing each other, to hold the built-in component 6 from both ends, as shown in FIG. 10C. Then, the elevator 5 is moved down, with the built-in component 6 released, and retracts to an initial position. The initial position of the elevator 5 can be any position as long as it does not interfere with the main bodies 3b and 4b of the first molding die 3 and second molding die 4 when they are closed.

<Step of Closing Molding Dies>

Next, the main bodies 3b and 4b of the first molding die 3 and second molding die 4 are moved closer in the direction of facing each other, and the first molding die 3 and second molding die 4 are clamped, as shown in FIG. 11A.

<Step of Blow Molding>

Next, the first positive pressure applying device (not shown) applies the positive pressure P1 (first positive pressure) from inside the parison S in the first molding die 3 and second molding die 4, as shown in FIG. 11B. This causes the parison S to be pressed to the molding portions 3a and 4a of the first molding die 3 and second molding die 4 and transferred. In addition, the second positive pressure applying device (not shown) applies the positive pressure P2 (second positive pressure) from outside the parison S in the recesses 3d and 4d (see FIG. 7) of the first molding die 3 and second molding die 4. This causes the parison S to be shaped along the neck portion 6c of the built-in component 6 (see FIG. 9). Note that the methods and order of applying the positive pressure P1 and positive pressure P2 are not particularly limited. The positive pressure P2 is preferably set higher than the positive pressure P1.

<Step of Cooling Parison>

Next, a cooling device (not shown) is used to circulate cooling air C in the first molding die 3 and second molding die 4, as shown in FIG. 11C. This causes the parison S to be cooled and cured.

<Step of Opening Molding Dies>

Next, the first molding die 3 and second molding die 4 are opened and a molded product U is taken out, as shown in FIG. 11D. Then, unnecessary burrs formed at both ends are cut to finish the fuel tank T (see FIG. 1).

According to the embodiment described above, the cap member 6e is placed on the head portion 6d of the built-in component 6, to prevent the parison S from entering the hollowed portions 6k during molding. Therefore, variations in thickness of the parison S can be suppressed and a barrier layer can be prevented from being ruptured or damaged.

In addition, the shoulder portion 6b is formed with the communicating portions 6h, to allow the air in the hollowed portions 6k to be discharged to the body portion 6a. That is, the air in the gap 6j flows through the communicating portions 6m to the hollowed portions 6k, and the air in the hollowed portions 6k is discharged through the communicating portions 6h into the tank body Ta. Thus, the air can be securely discharged, and the parison can be securely shaped around the neck portion 6c.

In addition, a plurality of the hollowed portions 6k are formed, and the communicating portions (third communicating portions) 6i are formed to communicate the adjacent hollowed portions 6k with each other. Therefore, the air around the neck portion 6c is more efficiently discharged into the tank body Ta through the communicating portions (first communicating portions) 6m, the communicating portions (second communicating portions) 6h, and the communicating portions 6i. Especially, in the present embodiment, the hollowed portion 6kc, which is formed in the center, communicates with a plurality of the communicating portions 6i, respectively. Therefore, for example, the air entering through the communicating portion 6ma is discharged through any one of or all of the communicating portions 6ha, 6hb, 6hc, and 6hd, to increase air discharge efficiency.

The embodiment of the invention have been described above, but can be appropriately modified within the scope of the present invention. For example, in the present embodiment, the columnar hollow holes 6g are formed to have a mesh-pattern in cross section, but any shape may be taken as long as the air in the hollowed portions 6k can flow into the tank body Ta. Further, in the present embodiment, the communicating portions 6i are formed to have a groove shape at the opening ends of the hollowed portions 6k, but may be formed as holes as with the communicating portions 6m or the communicating portions 6h. When the communicating portions 6i are formed to have a hole shape, they may be formed at any position as long as the adjacent hollowed portions 6k can be communicated with each other.

In addition, in the present embodiment, the parison is wrapped around the neck portion by the positive pressure (blow molding) from the outside of the parison to anchor the built-in component, but other molding methods may be used.

REFERENCE SYMBOLS

6: built-in component; 6a: body portion; 6b: shoulder portion; 6c: neck portion; 6d: head portion; 6e: cap member;

6*m*: communicating portion (first communicating portion); 6*h*: communicating portion (second communicating portion); 6*i*: communicating portion (third communicating portion); 6*k*: hollowed portion; S: parison; T: fuel tank; Ta: tank body.

The invention claimed is:

1. A fuel tank comprising a tank body and a built-in component, which includes a head portion, a neck portion, and a shoulder portion, the built-in component being anchored to the tank body with a parison wrapped around the neck portion during molding of the tank body, wherein
    the head portion and the neck portion are formed with at least one hollowed portion, which is open to an end surface of the head portion, and
    a cap member is provided to seal an opening of the at least one hollowed portion.

2. The fuel tank as claimed in claim 1, wherein
    the neck portion is formed with a first communicating portion which communicates an outside thereof with the hollowed portion,
    the shoulder portion is formed with a second communicating portion which communicates the hollowed portion with an interior of the tank body, and
    air outside the neck portion flows into the interior of the tank body through the first communicating portion and the second communicating portion.

3. The fuel tank as claimed in claim 2, wherein the at least one hollowed portion includes a plurality of hollowed portions, and a third communicating portion is formed to communicate the adjacent hollowed portions with each other.

* * * * *